United States Patent
Platt

(10) Patent No.: US 7,564,373 B2
(45) Date of Patent: Jul. 21, 2009

(54) SYSTEM AND METHOD FOR DETECTING ICE FORMATION ON AN AIRCRAFT

(75) Inventor: Clyde F. Platt, White Plains, NY (US)

(73) Assignee: Safe Flight Instrument Corporation, White Plaines, NY (US)

( * ) Notice: Subject to any disclaimer, the term of this patent is extended or adjusted under 35 U.S.C. 154(b) by 388 days.

(21) Appl. No.: 11/564,878

(22) Filed: Nov. 30, 2006

(65) Prior Publication Data

US 2008/0128556 A1   Jun. 5, 2008

(51) Int. Cl.
*G08B 21/00* (2006.01)
*B64D 15/20* (2006.01)

(52) U.S. Cl. .................................. 340/962; 244/134 F

(58) Field of Classification Search ......... 340/962–966, 340/945, 580–583, 601, 679, 665, 669; 244/134; 702/3, 41–44

See application file for complete search history.

(56) References Cited

U.S. PATENT DOCUMENTS

| | | | | |
|---|---|---|---|---|
| 4,873,510 A | * | 10/1989 | Khurgin | 340/580 |
| 6,052,056 A | * | 4/2000 | Burns et al. | 340/583 |
| 6,140,942 A | * | 10/2000 | Bragg et al. | 340/962 |
| 6,304,194 B1 | * | 10/2001 | McKillip | 340/962 |
| 6,347,767 B1 | * | 2/2002 | Holmen | 244/134 F |

* cited by examiner

*Primary Examiner*—Benjamin C Lee
*Assistant Examiner*—Michael Shannon
(74) *Attorney, Agent, or Firm*—Cohen Pontani Lieberman & Pavane LLP

(57) ABSTRACT

A system and method for detecting ice formation on the surface of an aircraft includes a small rotatable disc disposed on and flush with a surface of a aircraft wing and/or stabilizer and a DC motor for rotating the disc. The disc is rotated periodically and the peak current which is directly proportional to the torque required to break any ice is monitored. When the torque exceeds a pre-selected amount a warning is sounded in the cockpit. If the torque required to rotate the disc increases a second warning is given and the amount of ice accumulation is calculated. In one embodiment of the invention, a stall warning system is automatically modified to increase the margin to accommodate for the increase due to ice accumulation.

16 Claims, 5 Drawing Sheets

SYSTEM AND METHOD FOR DETECTING ICE FORMATION ON AN AIRCRAFT

FIELD OF THE INVENTION

This invention relates to a system and method for detecting the formation of ice on an outer surface of an aircraft and more particularly to a system and method for detecting ice accumulation on the surface of the aircraft. The invention also relates to a system and method for increasing the margin on a stall warning system to accommodate for ice accumulation.

BACKGROUND FOR THE INVENTION

The accumulation of ice on various surfaces of an aircraft can produce disastrous results. Accordingly, it is important for a pilot to know when ice starts to appear and to take measures to avoid serious consequences. For example, a pilot may turn on surface heaters, make changes in speed or elevation, changes in the angle of attack and/or seek the nearest airport and land before the problem becomes critical.

Over the years there have been a number of approaches for detecting icing on an aircraft during flight. For example, a U.S. Pat. No. 3,996,787 of Edgington discloses an Apparatus for Indicating Ice Accretion. As disclosed therein such apparatus includes an endless test surface upon which ice forms and a gas flow passage terminating adjacent to the test surface in an aperture which is presented to and spaced by a known gap from the test surface. A flow of gas is generated in the passage toward the aperture and a drive mechanism drives the test surface past the aperture at a constant rate. An ice removal device is operable to remove ice from the test surface after the surface has moved past the aperture and a sensor detects variations in the flow or pressure of the gas in the passage. Such variations arise from the effect on gas flow of restriction of the gas by ice forming on the surface. An instrument is associated with the sensor to provides an indication of the extent of the variation in flow or pressure and provide an indication of the rate at which ice is being accumulated on the test surface.

A more recent approach for determining ice formation on a aircraft's surface is disclosed in a co-pending U.S. patent application of Paul Levine entitled Optical Systems and Element for Detecting Ice and Water, Ser. No. 11/168,363 filed on Jun. 29, 2005 and assigned to Safe Flight Instrument Corporation, the same Assignee of the present application. As disclosed therein, an optical system for detecting ice and water on the surface of an aircraft includes an elongated transparent optical element having first and second end portions. A light source and light detector are disposed in one end of the optical element and a reflective surface is disposed in the opposite end portion. The reflective surface defines a critical angle and reflects light from the light source to the light detector when the critical angle is in contact with air and refracts light toward the external environment when the reflective surface is in contact with ice or water. The system may also incorporate an optical element wherein the reflective surface includes a continuous array of convex elements extending outwardly from and across one end of the optical element and wherein each of the convex elements defines a critical angle. The Levine application is incorporated herein in its entirety by reference.

Not withstanding the above, it is presently believed that there is a need and a potential market for an improved ice detector and system and method in accordance with the present invention. Such systems provide an indication of initial ice formation and subsequently an indication of the rate of ice formation or thickness of accumulated ice. In addition to the above, the systems in accordance with the present invention provide periodic or intermittent tests and an audible warning as soon as ice formation is detected. Then, if the thickness of the ice increases the system provides a second audible warning distinguishable from the first signal that the thickness of the ice or rate of ice deposit has increased. Then if the thickness increases again a third warning may be provided. In one embodiment of the invention, ice detection and accretion system is combined with a stall warning system and increases the margin in the stall warning system to accommodate for the ice formed on the aircraft. It is also believed that the system in accordance with the present invention is durable, reliable, can be manufactured at a competitive cost and easily serviced.

BRIEF SUMMARY OF THE INVENTION

In essence, the present invention contemplates a system for detecting the formation of ice on an outer surface of an aircraft, as for example, on a wing and/or horizontal stabilizer. The system includes means for defining a small moveable surface area such as a rotatable disc or cylinder that is flush with an outer surface of an aircraft wing or stabilizer and exposed to the atmosphere. The system also includes means for rotating the small moveable surface area to break any ice formed on or between the small moveable surface area and the surface of the aircraft and means for determining the torque required to rotate the small moveable surface area. In addition, the system includes means for warning a pilot of ice formation when the torque required to rotate the small moveable surface area exceeds a pre-selected amount to break any ice formed on or between the small rotatable surface area and the surface of the aircraft.

A preferred embodiment of the invention includes means for periodically rotating the small moveable surface area and means for generating a second signal readily distinguishable from the first signal in the event of ice accumulation. Ice accumulation is indicated when the torque required to rotate the small moveable surface area, to thereby break the ice on or between the small moveable surface area and the surface of the aircraft, exceeds a pre-selected amount and the torque required to rotate the small moveable surface area in a subsequent tests exceeds the amount of torque in the previous rotation.

The invention also contemplates a method for detecting ice formation on an outer surface of an aircraft including the steps of providing a small moveable disc or cylinder flush with an outer surface of an aircraft and exposed to the atmosphere. The disc or cylinder is periodically rotated. The method also includes the steps of determining the torque required to rotate the small disc or cylinder and warning a pilot of ice formation when the torque required to rotate the small moveable disc exceeds a pre-selected amount.

In a further preferred embodiment of the invention, the method provides a second warning clearly distinguished from a first warning that ice is accumulating on the surface of the aircraft. The second warning is given when the torque required for rotation of the disc exceeds the torque responsible for the first warning. The time between warnings and increase in torque can also be used to calculate the rate of ice formation and/or weight of accumulated ice.

The invention will now be described in connection with the accompanying drawings.

DESCRIPTION OF THE PREFERRED EMBODIMENTS OF THE INVENTION

Figure 1B:
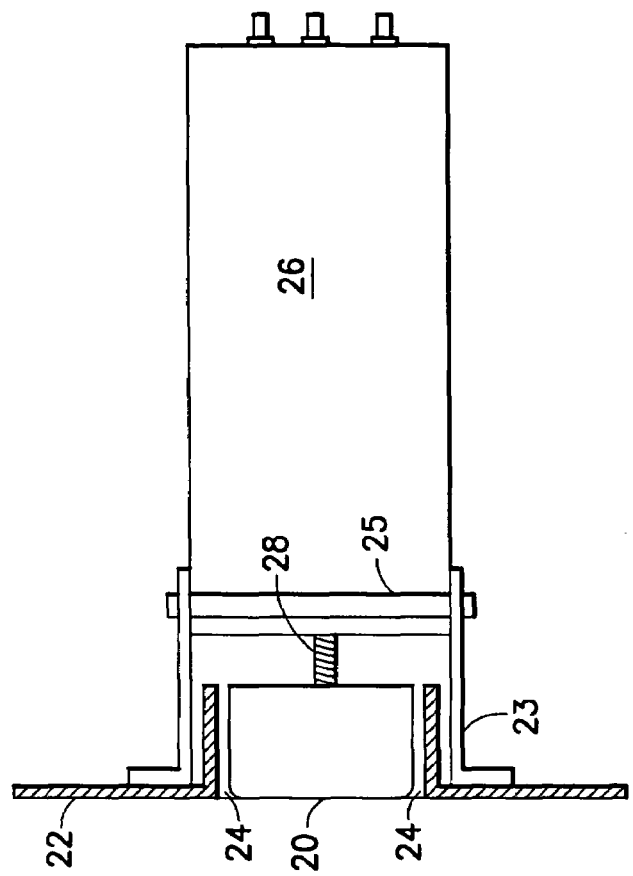
FIG. 1B is schematic side view illustrating the portion of the aircraft using the aircraft's surface and rotatable disc shown in FIG. 1A with a mounting bracket and DC motor in accordance with the invention.

Aircraft icing can lead to serious handling qualities that sometimes lead to fatal accidents. In fact, there have been numerous accidents attributed to aircraft icing and subsequent loss of control of the aircraft. The FAA's accident data base shows that 295 accidents were caused by icing for the years 1994 through 2003.

The handling quality deterioration under icing conditions is due to two factors. The first and most significant effect is on the air foils, the wing and horizontal stabilizer. For example, ice accumulated on the wing will disrupt the Laminar flow and cause a loss of lift. Ice accumulation on the horizontal stabilizer reduces the stability of the aircraft by reducing the downward force of the stabilizer. The change in shape or contour and the surface roughness causes a large increase in drag and a large reduction in the maximum lift coefficient.

The second factor leading to handling quality deterioration is the weight increase due to ice accumulated on the aircraft. The rate of climb, maximum altitude, stall speed, approach speeds and landing distances are all a function of aircraft weight. Knowing the current aircraft weight is important in operating the aircraft in a safe and efficient manner. Normally, the weight of the aircraft will decrease over the duration of the flight by the amount of fuel consumed. The flight crew routinely subtracts the amount of fuel consumed from the takeoff weight to determine the current weight of the aircraft. However, in icing conditions, the weight of the aircraft increases and the flight crew may not have a means to determine the weight of the ice.

The systems and methods in accordance with the present invention detect the formation of ice on an aircraft's surface and signal a pilot of the condition. These systems and methods can also be used to calculate the rate of ice accumulation or weight of the accumulated ice and automatically warn a pilot of an increased danger. The system and methods disclosed herein can also be used to activate anti-icing equipment on the aircraft as well as signaling a stall protection computer to increase the margin on the stall warning system. This equips a pilot to know the condition of the aircraft and to avoid a stall and subsequent loss of control of the aircraft.

A system for detecting the formation of ice on an outer surface of an aircraft, for example, the upper surface of a wing or horizontal stabilizer will now be described with reference to FIGS. 1A and 1B. As shown therein, a system for detecting the formation of ice and ice accumulation on an aircraft includes a small moveable area such as rotatable disc 20. The disc 20 in preferable about the size of a U.S. nickel and is mounted on an upper portion of an aircraft's wing 22, a small portion of which is shown, or horizontal stabilizer. This disc 20 is mounted flush with an upper surface of the wing 22. An upper surface of the disc 20 is exposed to the atmosphere and a small air gap 24 is provided between an outer edge of the disc 20 and inner edge of the surface of the wing 22.

Figure 1A:
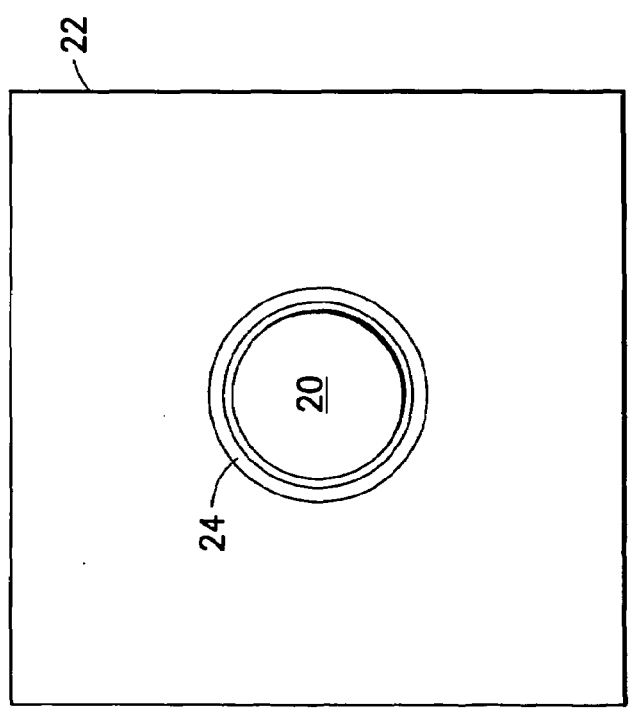
FIG. 1A is a top or plan view showing a portion of an aircraft's wing with a small rotatable disc disposed within that portion of the wing.

As shown in FIG. 1B the disc 20 has a generally cylindrical shape with a flat outer surface that is flush with the upper surface of the wing 22. The disc 20 is attached to a DC electric motor 26 and rotated by the motor 26 by means of a shaft 28. The motor 26 is fixed to an inner surface of the wing 22 by a mounting bracket 23 and clamp 25 or other conventional means. This mounting bracket and clamp position and fix the rotatable disc 20 in its position with respect to an outer surface of the wing 22.

When the aircraft is exposed to rain, the gap 24 is filled with water and the top surface is wet. Under such conditions, the disc 20 can be rotated by the motor 26 with very little torque. However, as the temperature drops the water in the air gap as well as on the surface will freeze and the disc 20 will not rotate until the torque is increased sufficiently to break the ice. The amount of torque required to break the disc free is an indication of the amount of ice that has accumulated.

In the practice of the invention the motor will periodically rotate the disc 20 as for example every 90 seconds. If it rotates easily with little current, there is no ice. However, if it does not immediately rotate, the peak current will build up and an ice annunciation will be made in the cockpit. Since the rotation of the disc 20 is provided by the DC motor 26, the torque is proportional to the amount of current being drawn by the motor 26. Therefore, the current to the motor 26 is monitored and the amount of torque is represented by the peak current required to break the disc free and is proportional to the amount of ice accumulated.

Figure 2:
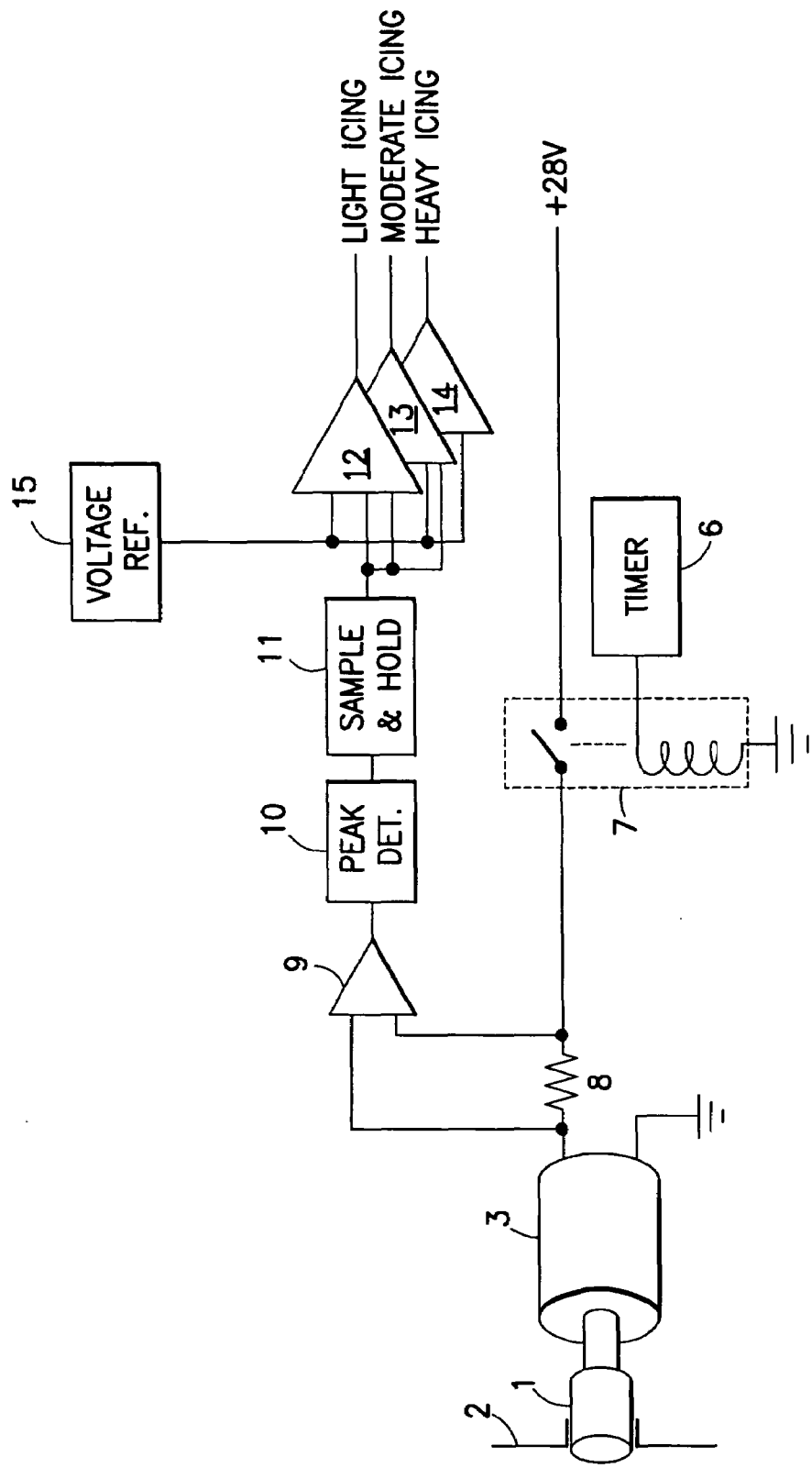
FIG. 2 is a schematic diagram illustrating a system for detecting ice formation on a an outer surface of an aircraft in accordance with a first embodiment of the invention.

FIG. 2 shows the electronics used to drive the motor to generate the torque and also measure the amount of torque that was required to rotate the cylinder. The rotating cylinder 1, the mounting plate 2 and the DC motor 3 are essentially the same as those shown in FIGS. 1A and 1B. A timer 6 is used to set how frequently the motor will be driven and for how long. For example, the proof of concept model, turns the motor on every 90 seconds for 10 seconds. The timer activates a relay 7 which applies power to the DC motor. On DC motors, the amount of current drawn is proportional to the amount of torque the motor is generating. The amount of current is sensed by a small value sense resistor 8. The voltage across the value sense resistor and is amplified by an instrumentation amplifier 9. The output from the instrumentation amplifier is then fed to a peak detector 10. The peak detector output is fed to a sample and hold circuit 11. A signal from the circuit 11 is then fed to three comparators, 12, 13 and 14. Each of these comparators 12, 13 and 14 is set to higher threshold. The lowest threshold would indicate the presence of light ice. The next threshold would be set for moderate icing and a final threshold would be set to indicate heavy icing. A voltage reference 15 is used to set the reference voltage for all three comparators. Individual set resistors (not shown) are used to set the threshold of each of the comparators.

Figure 3:
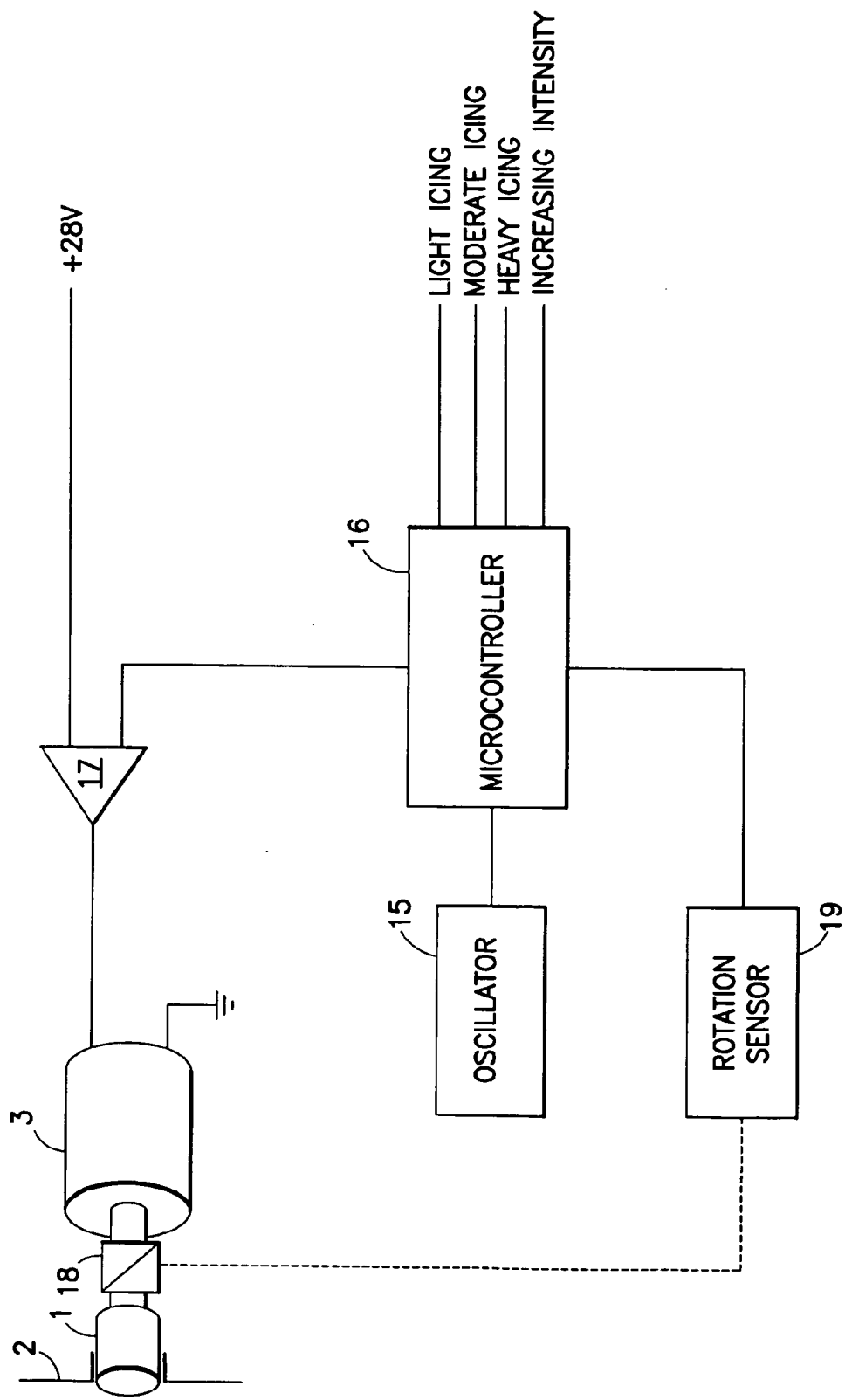
FIG. 3 is a schematic diagram illustrating a system for detecting ice formation on an outer surface of an aircraft in accordance with a second embodiment of the invention.

FIG. 3 is an alternate implementation using a micro-controller and torque programmed DC motor. The cylinder 1, the mounting plate 2 and the DC motor 3 are the same as in FIG. 2. This implementation uses an oscillator 15 to serve as a time base for the micro-controller 16. When a 90 second time occurs the micro controller 16 sends the lowest torque setting to the motor driver 17. The differential gear head 18 sends the rotation to the rotation sensor 19. The rotation sensor 19 may be an optical encoder, syncro or other angle detector. If the micro-controller 16 does not detect movement from the rotation sensor 19, the micro-controller 16 increases the torque in increments and continues to do this against torque value to determine if the icing is light, moderate or heavy. The micro-controller 16 also compares the sample against the previous one to determine if the rate of icing has increased.

Figure 4:
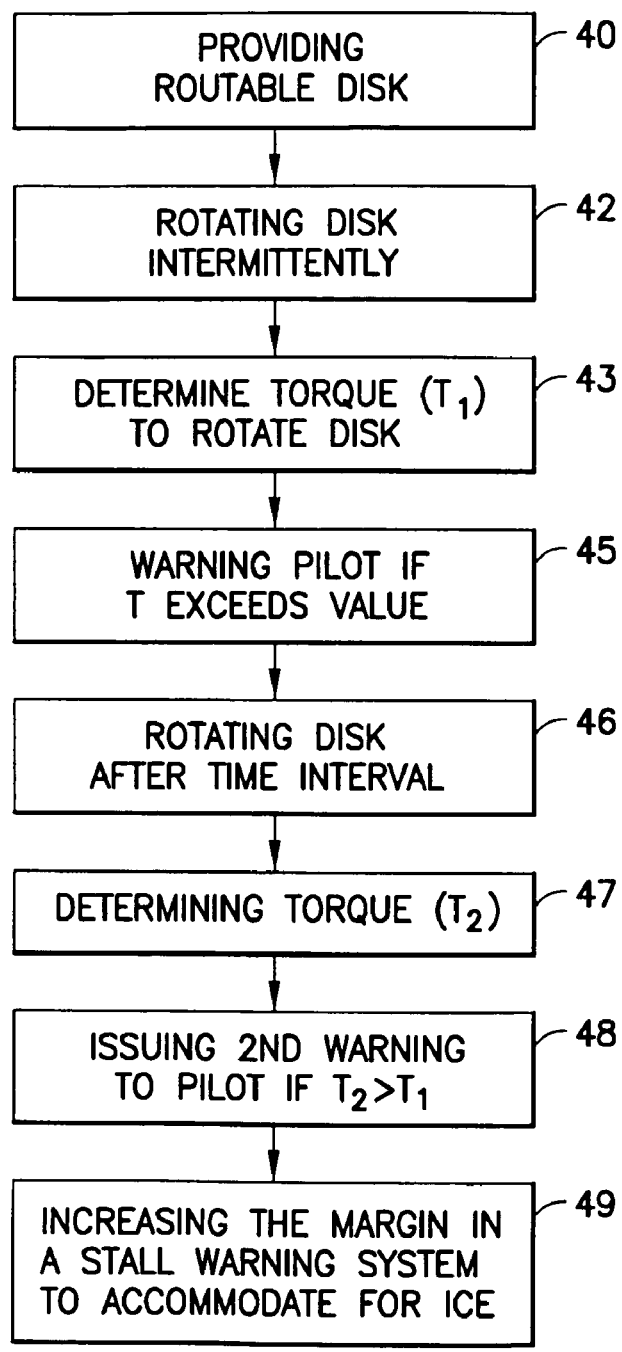
FIG. 4 is a block diagram of a method for detecting ice formation and the accumulation of ice on an aircraft's surface and warning a pilot of ice accumulation in accordance with a third embodiment of the invention.

A method for detecting the formation of ice on an outer surface of an aircraft is illustrated in FIG. 4. As illustrated, the method includes a step 40 of providing a small moveable surface area such as a disc flush with an upper outer surface of a wing or horizontal stabilizer. The method also includes the step 42 of rotating the small moveable surface area in step 43 and determining the torque required to rotate the small moveable surface area. In practice a small disc is rotated by a DC motor that is activated periodically as for example every 90 seconds. The peak current required to rotate the disc is directly proportional to torque. Then when the torque exceeds a predetermined level, an audible warning is sounded in the cockpit in step 45. After an interval of time, the disc is rotated again in step 46 and the torque for the subsequent rotation after the first warning is determined in step 47. When the torque in a subsequent torque determination exceeds the torque in a previous determination a second audible warning is sounded in the cockpit to warn the pilot of ice accumulation in step 48.

A computer or other means may be incorporated to determine the amount of accumulated ice based on the time between torque determinations and the amount of increase in torque. The relationship of increase in torque over time will vary from one type of aircraft to another and may take the form of a conventional look-up table. Such calculations are well within the ability of persons of ordinary skill in the art. The amount of accumulated ice or increase in weight is then automatically fed to a stall warning computer and that increases the margin on the stall warning system to accommodate for the increased weight due to the accumulation of ice in step 49.

Figure 5:
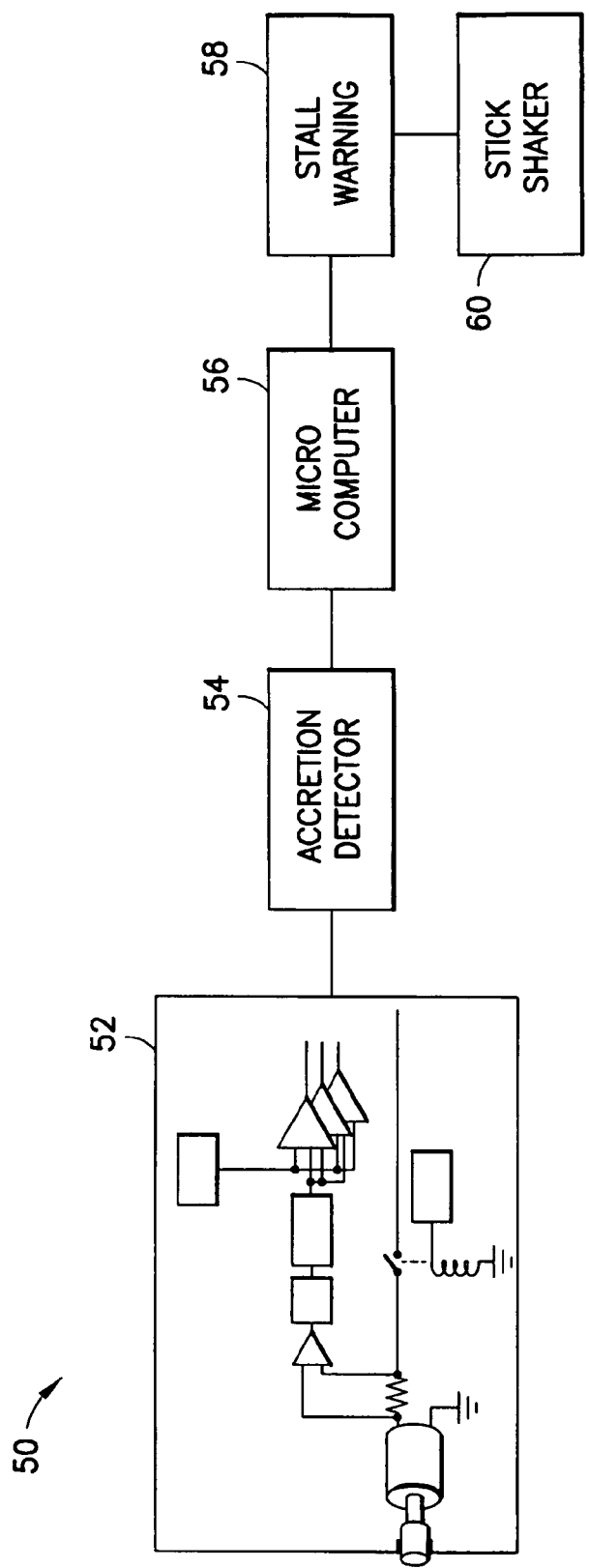
FIG. 5 is a simplified block diagram of a method and system for detecting ice formation on an aircraft and compensating a stall warning system for ice accumulation.

The method and means for increasing the margin in a stall warning system to accommodate for the amount of accumulated ice is illustrated in FIG. 5. As shown, a system 50 includes means to detect ice formation 52 such as an ice detector as described above. The means to detect ice formation generates a signal to indicate ice formation on the outer surface of the aircraft. The system 50 also includes means for determining the rate of ice formation 54 as for example by measuring an increase in torque to rotate a disc as disclosed here and above and the amount of time between an initial indication of ice formation and an indication of ice accumulation. Means for calculating the weight of accumulate ice 56 such as a computer determines the weight of the accumulated ice and sends a signal to a stall warning computer 58. The stall warning computer 58 then sends a signal to a stick shaker 60 to activate the stick shaker as a warning to a pilot that a stall may be imminent.

While the invention has been described in connection with its preferred embodiments is should be recognized that changes and modifications may be made therein without departing from the scope of the appended claims.

What is claimed is:

1. A system for detecting ice formation on an outer surface, said system comprising:
    means defining a small moveable surface area flush with the outer surface of an aircraft and exposed to the atmosphere;
    means for rotating said small moveable surface to break any ice formed between said small moveable surface and the surface of an aircraft;
    means for determining the torque required to rotate the small moveable surface area; and
    means for warning a pilot of ice formation when the torque required to rotate the small moveable surface area exceeds a pre-selected amount.

2. A system for detecting ice formation on an outer surface of an aircraft according to claim 1 which includes means for periodically rotating the small moveable surface area.

3. A system for detecting ice formation on an outer surface of an aircraft according to claim 2 in which said small moveable surface area is a portion of a cylinder.

4. A system for detecting ice formation on an outer surface of an aircraft according to claim 2 in which said small moveable surface area is a circular disc.

5. A system for detecting ice formation on an outer surface of an aircraft according to claim 2 in which said means for rotating said small moveable surface area is a DC electric motor.

6. A system for detecting ice formation on an outer surface of an aircraft according to claim 5 in which torque is determined by measuring the peak current to rotate the small moveable surface area.

7. A system for detecting ice formation on an outer surface of an aircraft according to claim 6 which includes means for comparing the peak currents at two periods of time and means for issuing a second warning signal of ice accumulation when a subsequent peak current exceeds a previous peak current that was above the pre-selected amount.

8. A system for detecting ice formation on an outer surface of an aircraft according to claim 4 in which the circular disc is flush with the surface of a wing.

9. A system for detecting ice formation on an outer surface of an aircraft according to claim 4 in which the circular disc is flush with the surface of a horizontal stabilizer.

10. A system for detecting ice formation on an outer surface of an aircraft according to claim 4 in which the disc has a small air gap between its edge and the surface of the aircraft.

11. A system for detecting ice formation on an outer surface of an aircraft according to claim 2 in which said means for rotating said moveable surface is a torque programmable motor which includes means for increasing the torque in small steps until the small moveable surface breaks free of ice.

12. A system for detecting ice formation on an outer surface of an aircraft according to claim 7 which includes means for determining the ice accumulation on the surface of the aircraft.

13. A system for detecting ice formation on an outer surface of an aircraft according to claim 12 which includes a stall warning system and means for increasing the margin on the stall warning system to accommodate for ice accumulated on the surface of the aircraft.

14. A method for detecting ice formation on an outer surface of an aircraft comprising the steps of:
    providing a small rotatable surface area flush with an outer surface of an aircraft and exposed to the atmosphere;

rotating the small moveable surface;

determining the torque required to rotate the small moveable surface; and warning a pilot of ice formation when the torque required to rotate the small moveable surface area exceeds a predetermined amount.

15. A method for detecting ice formation on an outer surface of an aircraft according to claim 14 in which the small moveable surface is rotated periodically and in which a second warning is given to the pilot when the torque required for a subsequent rotation exceeds the torque required for a previous rotation.

16. A method for detecting ice formation on an outer surface of an aircraft according to claim 14 which includes the step of providing a stall warning system and increasing the margin on the stall warning system to accommodate for ice accumulation.

* * * * *